United States Patent [19]

Cechanski

[11] Patent Number: 5,460,670
[45] Date of Patent: Oct. 24, 1995

[54] EXPLOSIVE COMPOSITION

[75] Inventor: Michael Cechanski, Mt. Thorley, Australia

[73] Assignee: Dyno Wesfarmers Limited, North Sydney, Australia

[21] Appl. No.: 178,097

[22] Filed: Jan. 6, 1994

[30] Foreign Application Priority Data

Feb. 3, 1993 [AU] Australia .................. 32825/93

[51] Int. Cl.⁶ .................. D03D 23/00; D03D 43/00
[52] U.S. Cl. .................. 149/109.6; 149/46; 149/61
[58] Field of Search .................. 149/46, 61, 109.6

[56] References Cited

U.S. PATENT DOCUMENTS

| | | | |
|---|---|---|---|
| 3,161,651 | 12/1964 | Stansbury et al. | 210/308 |
| 3,447,978 | 6/1969 | Bluhm | 149/2 |
| 4,141,763 | 2/1979 | Aonuma et al. | 148/105 |
| 4,141,767 | 2/1979 | Sudweeks et al. | 149/2 |
| 4,322,258 | 3/1982 | Sudweeks et al. | 149/2 |
| 4,356,044 | 10/1982 | Jessop et al. | 149/2 |

FOREIGN PATENT DOCUMENTS

| | | |
|---|---|---|
| 6738287 | 6/1987 | Australia . |
| 8331687 | 7/1988 | Australia . |
| 2993289 | 8/1989 | Australia . |
| 1412598 | 11/1975 | United Kingdom . |

Primary Examiner—Donald P. Walsh
Assistant Examiner—Anthony B. Chi
Attorney, Agent, or Firm—Abelman, Frayne & Schwab

[57] ABSTRACT

An explosive composition is provided which includes a hydrocarbyl polyamine emulsifier, characterized by a straight link between the hydrocarbyl group and said polyamine. A method of forming the composition is also provided, characterized by the emulsifier being produced by reacting an alkanolamine with a hydrocarbyl halide.

6 Claims, No Drawings

EXPLOSIVE COMPOSITION

This invention relates to an improved water-in-oil emulsion explosive, incorporating an improved emulsifier which contributes substantially to the effectiveness and operation of the explosion composition, and to a method of forming same.

BACKGROUND OF THE PRESENT INVENTION

Water-in-oil emulsion explosives are well-known. For example, such explosive compositions are disclosed in U.S. Pat. Nos. 4,356,044; 4,322,258; 4,141,763; 3,447,978 and 3,161,651. Emulsion explosives are found to have certain advantages over conventional aqueous slurry explosives which have a continuous aqueous phase, as for example described in U.S. Pat. No. 4,141,767. Further explosive compositions are known from Australian patent specifications Nos. 29932/89 (612,787); 67382/89; and 83316/87.

One inherent problem with emulsion explosives however is their relative instability, due to the fact that they include a thermodynamically unstable dispersion of supercooled solution or melt droplets in an oil-continuous phase. If the emulsion remains stable, these supercooled droplets are prevented from crystallising or solidifying into a lower energy state. However, if the emulsion weakens or becomes unstable, then crystallisation or solidification of the droplets results and the explosive composition generally loses some of its sensitivity to detonation and often becomes too viscous to handle for certain blasting operations. Moreover, it is relatively common to add solid components to emulsion explosives, for example in the form of glass microspheres for density reduction and prills or particles of oxidizer salt (such as for example porous prilled ammonium nitrate (AN) for increased energy. These solid components do however in many cases tend to destabilize emulsions.

It is common to use emulsion explosives as a repumpable explosive. That is, as an explosive that is formulated at a facility, and thereafter loaded or pumped into a bulk container and then transported in such a container to a blasting site, where it is repumped form the container into a bore hole. Alternatively, such an explosive may be delivered or repumped into a centrally located storage tank from which it will be further repumped into a vehicle for transportation to a blasting site and the again repumped into a bore hole.

It is therefore important that emulsion explosives remain stable even after being subjected to repeated handling or shearing action which normally tends to destabilise and emulsion. Further the viscosity of such emulsions must remain sufficiently low enough to allow for repumping at reasonable pressures and at a relatively low ambient temperature such as may be experienced during colder months of the year. Repeated handling or shearing action tends to increase an emulsion's viscosity.

It is an object of at least one aspect of the present invention to provide an explosive composition including an emulsifier, which goes some way towards overcoming or minimising the problems associated with explosive compositions known up until this time.

It is a further aspect of at least one aspect of this invention to provide a method of forming an explosive composition.

Other objects of the present invention will become apparent from the following description.

BRIEF SUMMARY OF THE PRESENT INVENTION

According to one aspect, the present invention provides an explosive composition including a hydrocarbyl polyamine emulsifier characterised by a straight link between said hydrocarbyl group and said polyamine.

According to a further aspect of this invention there is provided an explosive composition including a hydrocarbyl polyamine emulsifier characterised by a straight link between hydrocarbyl group and said polyamine, wherein said emulsifier is a compound of formula:

where R is a hydrocarbyl group containing at least 20 carbon atoms; R' is an amino substituted hydrocarbyl group and R" is a hydrogen atom or an alkyl group containing 1 to 4 carbon atoms.

According to a further aspect of this invention there is provided a method of forming an explosive composition, which includes a hydrocarbyl polyamine emulsifier, characterised by a straight link between said hydrocarbyl group and said polyamine, wherein said emulsifier is produced by reacting an alkanolamine with a hydrocarbyl halide.

DETAILED DESCRIPTION OF PREFERRED EMBODIMENT OF THE PRESENT INVENTION

The present invention relates to an improved explosive composition and more particularly a water-in-oil emulsion explosive composition which, as indicated above, sets out to overcome or minimize problems associated with such explosive compositions known and used up until this time. In preferred forms of the invention, the emulsion explosive composition of the present invention provides improved stability and compatibility with ingredients dissolved in oxidizer aqueous solution and with solids added to the formed emulsion.

The term "water-in-oil" as used throughout the specification and claims means a dispersion of droplets of an aqueous solution for water-miscible melt (a discontinuous phase) in an oil or water-immiscible organic material (a continuous phase).

The term "explosive" means both cap-sensitive explosives and non-cap-sensitive explosives.

In a preferred form of the invention, the water-in-oil emulsion explosives of the present invention contain a water-immiscible organic fuel as the continuous phase and a substantially emulsified inorganic oxidizer salt solution or melt as the discontinuous phase. The term "oxidizer", "solution" or "melt" hereinafter used throughout the specification and claims shall be interchangeable.

The term "solids" means a dry addition of "AN-prill" ANFO or sensitizing microspheres or an auxiliary fuel-type granules or other known additives.

Such oxidizers, fuel phases and added solids react with one another upon initiation by a blasting cap and/or booster to produce an effective detonation.

The explosive composition of the present invention is particularly characterised in that it includes a composition which comprises a hydrocarbyl polyamine emulsifier characterised in that a straight link entends between the hydrocarbyl group and the polyamine.

The explosive composition, in one form of the present invention, includes an emulsifier in the form of a polybutene polyamine alcohol, which is a compound of formula:

$$R-N(R'')-R'CH_2OH \quad (I)$$

where R is a hydrocarbyl group containing at least 20 carbon atoms; R' is an amino substituted hydrocarbyl group and R" is a hydrogen atom or an alkyl group containing 1 to 4 carbon atoms.

The group R preferably contains from 20 to 500 carbon atoms, most preferably from 30 to 150 carbon atoms.

R is preferably a hydrocarbyl group derived from the polymerization of an olefin. Suitable olefins includes ethylene, propylene, butylenes, and 4-methylpentene-1. The preferred olefin is isobutylene. The preferred materials are those ranging from about 800 to 3000 molecular weight with the most preferred materials having a polyisobutenyl radical of 1000 to 1500 molecular weights.

In general, these compositions will contain from about 4.6 to 0.5 percent by weight of nitrogen.

R' is preferably a polymethylene group containing 2 to 5 carbon atoms which is associated with an amino group, e.g. of formula:

$$-CH_2CH_2NHCH_2-$$

or $$-CH_2CH_2CH_2NHCH_2CH_2-$$

R" is preferably hydrogen.

In preferred forms of the invention reactants and build-up components of formula (I) are:

A. an alkanolamine (a compound in which nitrogen is attached by a straight link, to the carbon of an alkyl alcohol) of formula:

$$H-N(R'')-R'CH_2OH \quad (II)$$

and specifically here, the preferred alkanolamine is N-(2-aminoethyl) ethanolamine
with B. a hydrocarbyl halide of formula:
R—X where X=chloride or bromide and R is a hydrocarbyl group as defined hereinbefore.

A preferred olefin is polyisobutylene.

Preferably the molar ratio of alkanolamine to hydrocarbyl halide is in the ratio 2:1 to 5:1.

Preferably the hydrocarbyl halide contains an average between 1.4 to 2.0 halogen atoms per molecule of hydrocarbyl halide.

One preferred emulsifier according to one form of the invention is a long chain polyolefin (poly)amine alcohol produced through reaction of A with B (as referred to hereinbefore).

A preferred emulsifier used in this invention is available and marketed as an additive under the brand name ADX250 with an average molecular weight of 1100. It should however be appreciated that the additive marketed under the brand name ADX250 is primarily used in the lubricant industry and it has been found that the use of this additive as an emulsifier has particular advantages in so far as explosive compositions are concerned. These advantages are referred to and described in detail herein, and such an emulsifier has not previously been used in the explosives industry. Other emulsifiers according to the present invention can, however, be used to advantage.

The present invention incorporating a hydrocarbyl polyamine emulsifier, has substantial advantages and in particular adds stability to the explosive emulsion.

The immiscible organic fuel forming the continuous phase of the composition is present in an amount of from about 3% to about 12%, and preferably in an amount of from about 4% to about 8% by weight of the composition. The actual amount used can be varied depending upon the particular immiscible fuel(s) used and upon the presence of other fuels, if any. The immiscible organic fuels can be aliphatic, alicyclic, and/or aromatic and can be saturated and/or unsaturated, so long as they are liquid at the formulation temperature. Preferred fuels include tall oil, mineral oil, waxes, paraffin oils, benzene, toluene, xylenes, mixtures of liquid hydrocarbons generally referred to as petroleum distillates such as gasoline, kerosene and diesel fuels, and vegetable oils such as corn oil, cotton seed oil, peanut oil, and soybean oil. Particularly preferred liquid fuels are mineral oil, No. 2 fuel oil, paraffin waxes, microcrystaline waxes, and mixtures thereof. Aliphatic and aromatic nitro-compounds also can be used. Mixtures of the above can be used. Waxes must be liquid at the formulation temperature.

Optionally, an in addition to the immiscible liquid organic fuel, solid or other liquid fuels or both can be employed in selected amounts. Examples of solid fuels which can be used are finely divided aluminum particles; finely divided carbonaceous materials such as gilsonile or coal; finely divided vegetable grain such as wheat; and sulfur. Miscible liquid fuels, also functioning as liquid extenders, are listed below. These additional solid and/or liquid fuels can be added generally in amounts ranging up to 15% by weight. If desired, undissolved oxidizer salt can be added to the composition along with any solid or liquid fuels.

The inorganic oxidizer salt solution forming the discontinuous phase of the explosive generally comprises inorganic oxidizer salt, in an amount from about 45% to about 95% by weight of the total composition, and water and/or water-miscible organic liquids, in an amount of from about 2% to about 30%. The oxidizer preferably is primarily ammonium nitrate, but other salts may be used preferably in amounts up to about 50%. The other oxidizer salts are selected from the group consisting of ammonium, alkali and alkaline earth metal nitrates, chlorates and perchorates. Of these, sodium nitrate (SN) and calcium nitrate (CN) are preferred. From about 10% to about 65% of the total oxidizer salt may be added in particle or prill form.

Water generally is employed in an amount of from about 2% to about 30% by weight based on the total composition. It is however preferably employed in an amount up to about 30% by weight based on the total composition, although in one form of the invention in the range of about 5% to about 30% by weight based on the total composition. Water-miscible organic liquids can partially replace water as a solvent for the salts, and such liquids also function as a fuel for the composition. Moreover, certain organic liquids reduce the crystallisation temperature of the oxidizer salts in solution. Miscible liquid fuels can include alcohols such as methyl alcohol glycols such as ethylene glycols, amides such as formamide, and analogous nitrogen-containing liquids. As is well known in the art, the amount and type of liquid(s) used can vary according to desired physical properties.

The emulsifier of the present invention is a product of a long chain polyolefin and an alkanolamine both combined in a straight linkage.

As described hereinbefore, a particularly preferred derivative is the commercially available ADX250 which is a compound product of a polyisobutylene and N-(2-aminoethyl)-ethanolamine preferably carried in an organic solvent.

The emulsifier of the present invention can be used singly or in combination with other emulsifiers such as sorbitan fatty esters, glycol esters, substituted oxazalines, alkyl amines or their salts, other derivatives of polypropene or polybutene, derivatives thereof and the like.

The compositions of the present invention preferably are reduced for their actual densities to within the range of from about 0.5 to about 1.5 q/cc.

The commonly known density reducing agents that may be used include glass spheres, plastic spheres, perlite, chemical gassing agents, foaming agents. These are by way of example.

Thickening and crosslinking agents are not necessary for stability and water resistancy, but can be added if desired.

The explosives of the present invention may be formulated in a conventional manner. Typically, the oxidizer salt(s) first is dissolved in water (or aqueous solution of water and miscible liquid fuel) at an elevated temperature of from about 25° C. to about 90° C. or higher depending upon the crystallisation temperature of the salt solution.

The aqueous solution then is added to a solution of the emulsifier and the immiscible liquid organic fuel, which solutions preferably are at the same elevated temperature, and the resulting mixture is stirred sufficiently to produce a water-in-oil emulsion. Stirring should be continued until the formulation is uniform.

The solid ingredients, if any, then are added and stirred throughout the emulsion.

The formulation process also can be accomplished in a continuous manner as is known in the art.

It is advantageous to preblend the emulsifier in the liquid organic fuel prior to adding the organic fuel to the aqueous solution. This way the emulsion forms quickly and with minimum agitation.

Sensitivity and stability of the composition may be improved slightly by passing then through a high-shear system to break the dispersed phase into even smaller droplets prior to adding the density control agent.

We now refer to the following table I which further illustrates the invention and in particular the advantages thereof. In table I, examples 3, 6, 7 and 10 all relate to explosive compositions containing SMO-Sorbitan Monooleate, a commonly used emulsifier. Examples 1, 8 and 12 contain SMO-PIBSA-derivative combination, wherein PIBSA is Polyisobutenyl Succinic Anyydride. In table I, examples 2, 4, 5, 9, 11 and 13 all relate to explosive compositions incorporating an emulsifier according to the present invention.

The study products were matrixes, sensitized (solids, gassed) and blends with ANFO. Both booster sensitive and cap-sensitive (No 8 detonator) formulations were tested. All samples were stored for an extended period of time and observed/tested regularly. Values shown in table I are reported as weeks stability at 20° C. with observation on the degree of crystallization. Table I also illustrates the improved shelf-life storage stability provided by an emulsifier of the present invention. Example 2 is for a cap-sensitive product while examples 4, 5 and 9 are for booster-sensitive formulations. Examples 11 and 13 illustrate also the improved stability for blends of emulsion matrixes with ANFO.

TABLE I

| INGREDIENTS | MIX EXAMPLE No: | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| AN | 72.0 | 72.0 | 64.0 | 64.0 | 64.0 | 77 | 77 | 77 | 77 | 44.8 | 44.8 | 53.9 | 53.9 |
| NHCN | | | 14.0 | 14.0 | 14.0 | | | | | 9.8 | 9.8 | | |
| SN | 10.0 | 10.0 | | | | | | | | | | | |
| H$_2$O | 10.0 | 10.0 | 15.0 | 15.0 | 15.0 | 16 | 16 | 16 | 16 | 10.5 | 10.5 | 11.2 | 11.2 |
| DFO No 2 | | | 5.5 | 5.5 | 5.5 | 5.5 | | | 5.5 | 3.85 | 3.85 | | |
| Mineral Oil | 0.9 | 1.0 | | | | | 5.5 | 5.5 | | | | 3.85 | 3.85 |
| SMO - Emulsifier | 1.0 | | 1.5 | | | 1.5 | 1.5 | 1.4 | | 1.05 | | 0.98 | |
| PIBSA - co emulsifier | 0.1 | | | | | | | 0.1 | | | | 0.07 | |
| PIB - Alkanolamine (ADX250) | | 1.0 | | 1.5 | 1.0 | | | | 1.5 | | 1.05 | | 1.05 |
| WAX (Paraffin/Microcr) | 3.0 | 3.0 | | | | | | | | | | | |
| Q-719 | 3.0 | 3.0 | | | | | | | | | | | |
| Gassing Additives | | | | | 0.4 | | | | | | | | |
| ANFO | | | | | | | | | | 30.0 | 30.0 | 30.0 | 30.0 |
| Density (g/cc) | 1.18 | 1.18 | 1.40 | 1.40 | 1.15 | 1.33 | 1.33 | 1.33 | 1.33 | 1.35 | 1.35 | 1.30 | 1.30 |
| Storage Temp | 20 | 20 | 20 | 20 | 20 | 20 | 20 | 20 | 20 | 20 | 20 | 20 | 20 |
| No Cycles [1 cycle = −20°(24 h) + 20°(24 h)] | 10 | 20 | — | — | — | — | — | — | — | — | — | — | — |
| Degree of Crystallisation | After Cycling | | | | | | | | | | | | |
| 1 week | None | None | None | None | None | Mod | Slight | Slight | None | Slight | None | Slight | None |
| 2 weeks | | | | | | Heavy | Mod | Slight | | Mod | | | |
| 3 weeks | Slight | None | Mod | | | | | | | Heavy | None | Heavy | Slight |
| 4 weeks | | | Heavy | None | None | | Heavy | Mod | | | | | |
| 8 weeks | | | | | | | | | Slight | | Slight | | Mod |
| 12 weeks | | | | | | | | | | | | | |
| 16 weeks | | | | | None | | | | | | | | |
| 20 weeks | Mod | None | | None | | | | | Mod | | | | |

TABLE I-continued

| | MIX EXAMPLE No: | | | | | | | | | | | | |
|---|---|---|---|---|---|---|---|---|---|---|---|---|---|
| INGREDIENTS | 1 | 2 | 3 | 4 | 5 | 6 | 7 | 8 | 9 | 10 | 11 | 12 | 13 |
| 30 weeks | | | | | | | | | | | | | |
| 40 weeks | | Slight | | None | Slight | | | | | | | | |

The invention will now be described and illustrated by way of example only (without limitation) with reference to example 2, 5 and 11 as shown in the above table I. By way of example, the parts and percentages are expressed by weight.

EXAMPLE 2 (Cap-sensitive formula)

A mixture of technical grade ammonium nitrate (72.0 parts), sodium nitrate (10.0 parts) and water (10.0 parts) was heated with stirring to a temperature of about 95° C. to give an aqueous solution. The hot salt solution was then poured, with rapid stirring, into a hot solution (90° C.) of 1.0 part of ADX 250 (commercially available polyisobutene alkanolamine) mixed with 3.0 parts of microcrystalline and paraffin waxes and 1 part of mineral oil. Stirring was continued until a uniform emulsion was obtained. A solid bulking agent (Q-719 glass microspheres from PQ AUSTRALIA) as sensitizer was also added (3 parts) and a cap-sensitive explosives was formed.

The explosive while still hot was placed in Ø25×200 mm plastic film for evaluation of stability.

EXAMPLE 5 (Booster sensitive formula)

A mixture of technical grade ammonium nitrate (64 parts), Norsk Hydro Calcium nitrate (14 parts) and water (15.1 parts) was heated with stirring to a temperature of about 75° C. to give an aqueous solution. The solution was then poured, with rapid stirring and after pH adjustment, into a hot solution (70° C.) of 1.0 part of ADX250 mixed with 5.5 parts of No 2 fuel oil. Stirring was continued until a uniform emulsion was obtained. A gassing additive was added to bring the density down to ca. 1.15 g/cc. The product sample was then taken for observations and evaluation against similar products but based on conventional SMO (sorbitan monooleate)—example 3; or SMO/PIBSA-derivative products—example 8.

EXAMPLE 11 (Booster sensitive formula in blend with ANFO)

The procedure of example 5 was repeated except that 1.5 parts of the ADX250 was used and non-gassing components were added. The formed emulsion was blended then with dry ANFO blend in 70:30 ratio.

The examples 11 and 13 showed the improved storage stability provided by the ADX250 of the invention compared to a conventional emulsifier in examples 10 and 12.

It should be appreciated that the composition of the present invention can be used in a conventional manner and compositions can be used both as packaged, small diameter products or as bulk products. Generally the compositions may be extrudable and/or pumpable.

The invention has been described by way of example only and it should be appreciated that modifications and improvements may be made thereto without departing from the scope of the invention as defined by the appended claims.

I claim:
1. A method of forming an explosive composition comprising a hydrocarbyl polyamine emulsifier having a straight link between the hydrocarbyl group and said polyamine, wherein said hydrocarbyl polyamine emulsifier is produced by reacting an alkanolamine with a hydrocarbyl halide.
2. A method as claimed in claim 1, wherein the alkanolamine is a compound in which nitrogen is attached by a straight link to the carbon of an alkyl alcohol of formula:

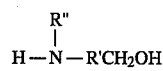

3. A method as claimed in claim 1, wherein the alkanolamine is N-(2-aminoethyl) ethanolamine.
4. A method as claimed in claim 1, wherein said hydrocarbyl halide has the formula R—X wherein X equals chloride or bromide, and R equals a hydrocarbyl group (as herein defined).

5. A method as claimed in claim 1, wherein the molar ratio of alkanolamine to hydrocarbyl halide is in the ratio 2:1 to 5:1.
6. A method as claimed in claim 1, wherein the hydrocarbyl halide contains an average of between 1.4 to 2.0 halogen atoms per molecule of hydrocarbyl halide.

* * * * *